United States Patent Office 3,430,252
Patented Feb. 25, 1969

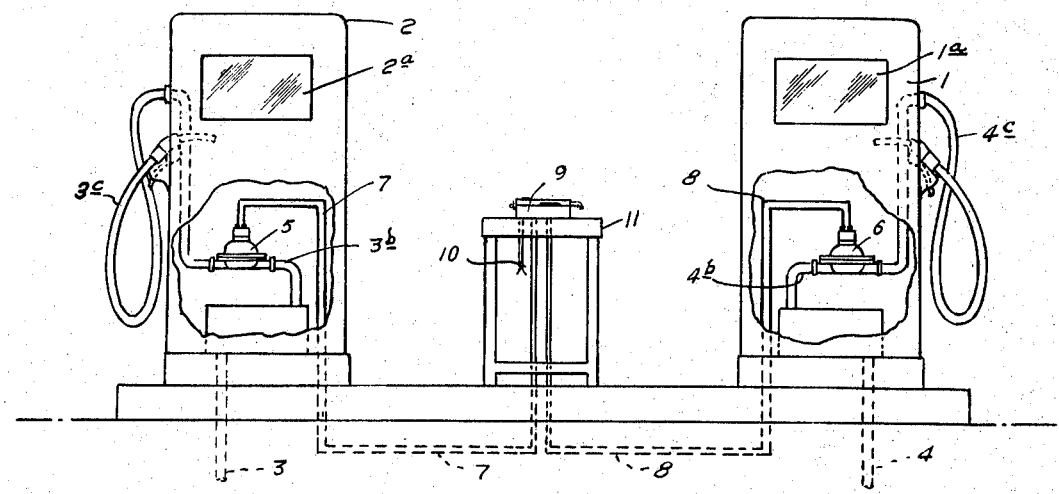
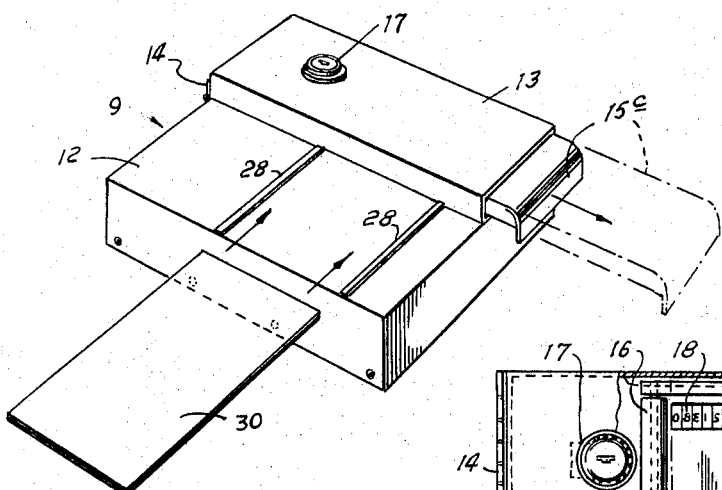
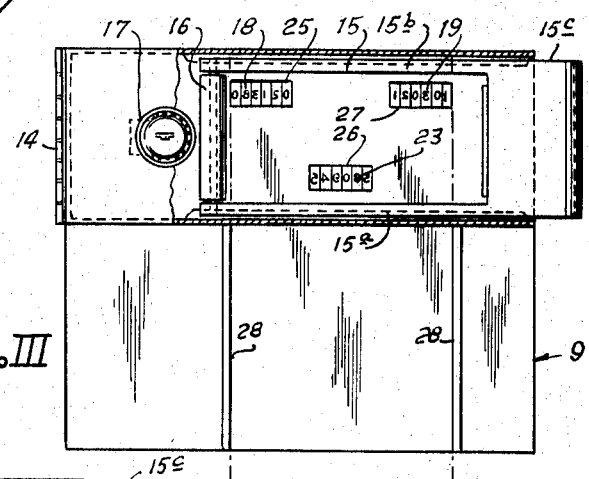
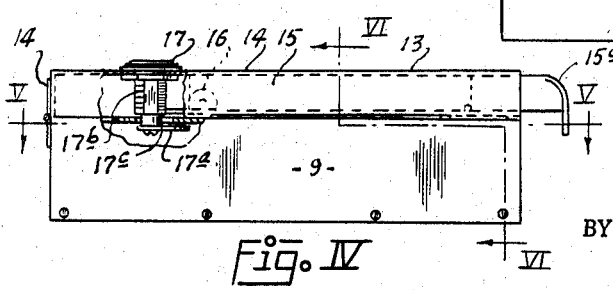
Fig. I
Fig. II
Fig. III
Fig. IV
INVENTOR
William A. Bonner
BY Howard E. Moore
ATTORNEY

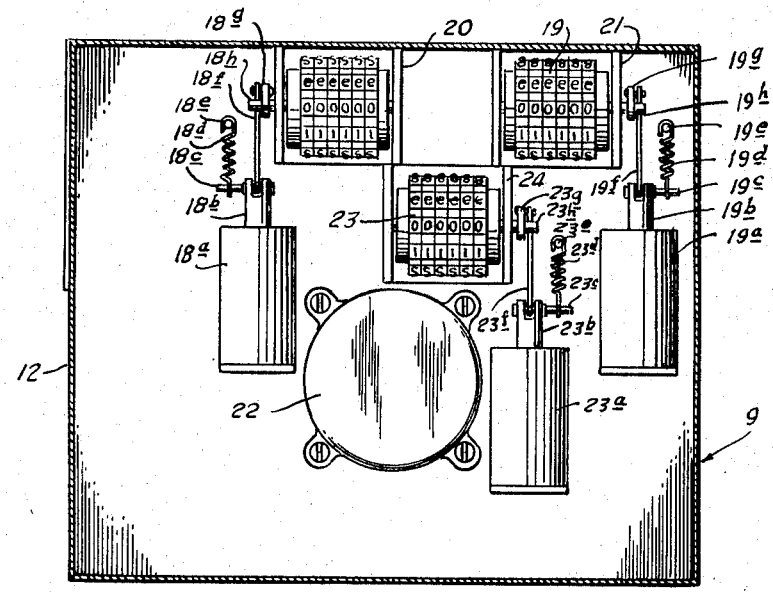
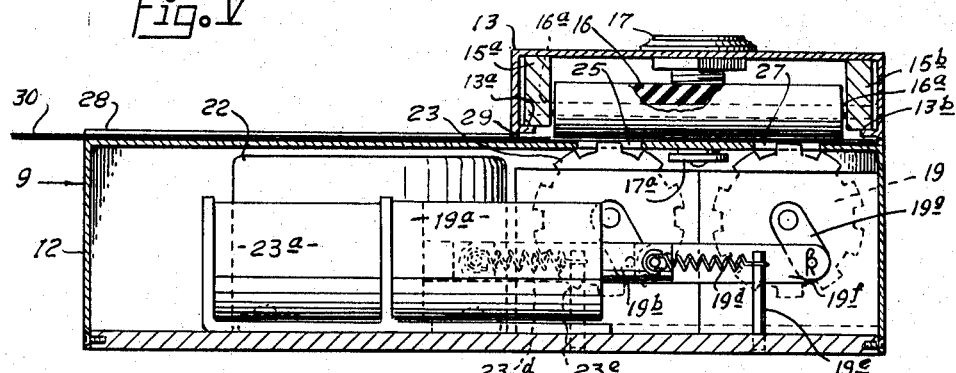

3,430,252
APPARATUS FOR RECORDING AND DOCUMENT-
ING QUANTITIES DISPENSED IN RELATION TO
TIME
William A. Bonner, 7001 Oakland St.,
Fort Worth, Tex.
Filed July 8, 1966, Ser. No. 563,802
U.S. Cl. 346—43                6 Claims
Int. Cl. G01d 9/26

ABSTRACT OF THE DISCLOSURE

A device for measuring and recording quantities of substances such as gallons of liquid, cubic feet of gas, weight or volume of solids, electrical wattage or other measured quantities dispensed in relation to any selected time.

---

This invention has to do with recording measured quantities such as gallonage, cubic feet of gas, electrical wattage or other measured quantities as of a selected time period, and is particularly concerned with a device for recording gallonage of a liquid dispensed, such as gasoline, at the end of a selected period of time.

In dispensing liquids such as gasoline, diesel fuel oil, etc., from bulk storage containers over protracted periods of time it is desirable to automatically record the amount of liquid dispensed as related to time, and that means be provided for transferring such recorded information to documentary form so that a permanent record may be made thereof at any selected time. Such recordation and documentary transference of such information at selected times is particularly desirable where by virtue of price changes in the commodity, such as a gasoline filling station, it is desirable for both the operator and the supplier of consigned fuel to make a documentary record of the supply on hand at a given time for the purpose of accurately recording the amount dispensed while a given price is in effect or at the time of a price change.

It will be understood however that the general principle of recordation increments of quantities over a period of time and the transference of the recorded information to documentary form at a given time can be adapted for use in the recordation of different and varied media such as liquid, gaseous fluid, electrical energy, etc.

It is therefore a primary object of the invention to provide a simple, economically manufactured device for recording and documenting the quantity of fluid dispensed or consumed over a given period of time and at a selected instant of time.

Another object of the invention is to provide means for recording in documentary form measured units of liquid such as fuel dispensed as of a selected time so that the user or consumer may have an accurate documented record of the amount of fuel purchased at a given time, thereby eliminating the chance of error in manually transferring information of such character to documentary form.

Another object of the invention is to provide the consignor of bulk fluids such as an oil company to a filling station with an accurate documented record of the status and amount of consigned inventory at a selected time so as to be enabled to determine by a documented record the exact units of fluid withdrawn from consigned bulk fluid inventories to facilitate accurate accounting and payment only for consigned stock used.

Another object is to provide such a device as hereinbefore indicated wherein the recordations of the device are protected from mechanical injury and from the possibility of tampering with by unauthorized persons.

Other and further objects of the invention will become apparent upon reading the detailed specification hereinafter following and by referring to the drawings annexed hereto.

A suitable embodiment of the invention is shown in the attached drawings wherein FIG. I is a side elevational view partially cut away showing a typical mounting and use of the recording and documenting device used in conjunction with recording and documenting liquid fuel such as gasoline from typical filling station pumps;

FIG. II is a top perspective view of the recording and documenting device showing a recording ticket about to be placed therein for recording information thereon;

FIG. III is a top plan view partially cut away of the recording and documenting device;

FIG. IV is a side elevational view partially cut away;

FIG. V is a transverse sectional view taken on a line V—V of FIG. IV;

FIG. VI is a cross sectional elevational view taken on the line VI—VI of FIG. IV;

FIG. VII is a schematic view of the electrical circuit employed with the device; and FIG. VIII is a bottom plan view of a typical recording ticket, with the transfer layer peeled back to expose the recorded information.

Numeral references are employed to designate the various parts shown in the drawings and like numerals indicate like parts throughout the various figures of the drawings.

Referring now to the drawings, the numerals 1 and 2 indicate typical fuel dispensing pumps like those used at gasoline filling stations, which are supplied with fuel from bulk storaage container or containers through supply pipes 3 and 4. The supply pipes 3 and 4 pass through suitable manifold devices such as flow meters for recording gallonage and price information in the windows 1a and 2a, and supply conduits 3b and 4b lead therefrom to the dispensing filler hoses 3c and 4c.

Conventional flow meters 5 and 6 are disposed in the lines 3b and 4b. The flow meters 5 and 6 include contact elements 5a and 6a which are moved in response to gallonage indication in the customary manner to alternately move switch arms 5b and 6b into contact with the contact points 5c and 6c to close the circuit to close the counter relays and energize same in the manner hereinafter described.

Electrical leads 7 and 8 lead from the switches 5b and 6b to the solenoids 18a and 19a, which are disposed in the recorder 9.

Electrical energy is supplied for the energizing of the solenoids and the timer through supply conduits 10 from an appropriate power source.

The recorder device 9 is conveniently mounted on a stand 11 positioned between the pumps.

It will be understood that the recorder device could be located at any desired place either inside the filling station or outside and that the flow meters 5 and 6 could be located at any place in the supply line between the bulk storage container and the pump. The mounting of the flow meters and the recorder are shown for convenience only in FIG. I.

The recorder device 9 includes housing 12 having enclosure walls, and it is surmounted by a roller support casing 13. The roller support casing 13 is secured to one side of the housing 12 by a hinge 14 so that the casing 13 may be moved upwardly about the hinge 14 to expose the recorded information on the counter and for the purpose of adjustment and repairs.

A roller carrier 15 is comprised of spaced sides 15a and 15b which are slidable on the flanges 13a and 13b in the casing 13.

A resilient roller 16 is rotatably mounted on axles 16a to side members 15a and 15b. The roller carrier 15 may be moved inwardly and outwardly of the casing 13 by grasping the handle 15c. The operation of the roller 16 and carrier 15 therefore will be hereinafter described.

A disengageable lock mechanism 17 is provided for locking the casing 13 in closed position. The lock mechanism 17 preferably consists of rotatable shaft 17b having a lug 17a on the lower end thereof, which is arranged to pass through a passage 17c when in one rotative position and to engage the lower side of the upper wall of the housing 12 when rotated to another position as shown in FIGURE IV. When the lock 17 is disengaged the casing 13 may be swung upwardly about the hinge 14.

The conventional recording counters 18 and 19 are mounted on suitable brackets 20 and 21 inside the housing 12. The counters 18 and 19 are of the conventional type which are operated by ratchets therein in response to rotation of shafts extending outwardly thereof. The counters in this instance are arranged to record the number of gallons of fluid dispensed through each pump 1 and 2.

The counters 18 and 19 are operated by the solenoids 18a and 19a. Each solenoid 18a and 19a has an extensible core 18b and 19b extending therefrom, which is arranged to be drawn thereinto when the respective solenoid is energized.

Each core 18b and 19b has a pin 18c and 19c secured to the outer end thereof to which the springs 18d and 19d are attached. The springs 18d and 19d are secured at their outer ends to upwardly extending pins 18e and 19e secured to the lower wall of the housing 12. The springs are extended when the solenoid cores 18b and 19b are withdrawn thereinto so that when the solenoids 18a and 19a are de-energized the springs will relax and pull the cores outwardly of the solenoids.

Arms 18f and 19f are pivotally attached at their inner ends about the pins 18c and 19c and are pivotally attached at their outer ends to the links 18g and 19g. It will be seen that when the cores 18b and 19b are drawn inwardly the links 18g and 19g will rotate the shafts 18h and 19h extending outwardly of the counters 18 and 19 to thereby operate the counters in a manner to record gallonage dispensed by the respective pumps 1 and 2.

A conventional timer 22 is mounted to the bottom wall of the housing 12, the timer being arranged to close the switch 22a at selected intervals to thereby energize the timer solenoid 23a.

The timer solenoid 23a includes a movable core 23b which is drawn thereinto when the solenoid is energized. An outwardly extending pin 23c is attached to the outer end of the core 23b. One end of the spring 23d is attached to the pin 23c and the other end of the spring is attached to an upwardly extending pin 23e secured to the lower wall of the housing 12.

The arm 23f is pivotally attached at its inner end to the pin 23c and is pivotally attached at its outer end to the crank arm 23g. The inner end of the crank arm 23g is secured to the shaft 23h which extends into the conventional counter 23 which records increments of time. When the solenoid 23a is energized the core 23b is pulled thereinto, thereby rotating the shaft 23h to operate the counter 23.

The recorded information on the counters 18, 19 and 23 may be viewed through the rectangular windows 25, 26 and 27 and the embossed digits on the counters are exposed through such windows so that they may be brought into pressure contact with the ticket in the manner hereinafter described to record the information on said counters on the ticket.

A pair of guides 28 are provided on the upper surface of the housing 12 which are arranged to receive and guide therebetween a laminated ticket 30. The ticket 30 is arranged to pass through the slot 29 provided in the wall of the casing 13 so that the surface thereof will pass over the exposed embossed numerals on the counters 18, 19 and 23 to record the information thereon in the manner hereinafter described.

The ticket 30 is preferably multi-ply, as indicated at 31 and 32. The upper ply 31 has a carbon or other transfer material on the side thereof which is exposed to the lower ply 32 so that impression made thereon by the recorded information on the counters will be transferred to the ply 32 in order to provide recorded information thereon. The plies 31 and 32 may be peeled apart to provide two separate copies after the information is recorded thereon in the manner hereinafter described.

The operation and function of the device hereinbefore described is as follows:

Gallonage or other increments of measurement are continuously recorded on the counters 18 and 19 as the fluid flows through the flow meters 5 and 6 and the respective solenoids 18a and 19a are intermittently energized by the flow meters.

Increments of time are continuously recorded on the counter 23 by the timer 22.

When it is desired to record the number of gallons or other increments dispensed up to and including a particular instant of time, a ticket 30 is placed between the guides 28 in the manner shown in FIGURE II and through the slot 29 and over the windows 25, 26 and 27 and is stopped by the back side of the casing 13, thereby positioning the ply 31 over the exposed recorded embossed numerals exposed through the windows 25, 26 and 27. The handle 15c may then be grasped and the roller carrier 15 moved outwardly of the casing. The resilient roller 16 is pressed against the ply 32 of ticket 30, thereby pressing the ticket downwardly against the recorded information on the counters 18, 19 and 20. The counter numerals may be inked so as to imprint the information thereon on the ticket. The information on the counters at the particular time is imprinted on the lower ply 31 and is transmitted to the upper ply 32 through the carbon or other imprinting material on the back of the ply 31. As many copy plies may be provided as desired. Thus, the total gallonage as indicated at 33 is recorded in conjunction with the particular time 34 so that the total gallonage or other increments dispensed at exactly such time is recorded. Such recordation may take place at any selected time so that a record may be kept continuously in documentary form of the number of gallons or other increments dispensed through a given pump or device.

Of course it will be understood that only one such recording counter 18 and 19 may be employed with a given dispensing apparatus in conjunction with a time recording counter such as 23, or any number of such gallonage or other increment recording counters 18 and 19 may be employed in conjunction with a time recording counter as may be desired.

When it is desired to reset the counters or if repair need to be made thereto, the lock 17 may be disengaged and the casing 15 moved upwardly about the hinge 14 to expose the counters through the windows in which they are disposed.

Having described my invention I claim:

1. In a device of the class described, a housing having an upper surface, at least one fluid flow counter in the housing having raised digits thereon for recording accumulated increments of fluid flow; fluid dispensing apparatus; a conduit communicating with a fluid storage container and with the dispensing apparatus; fluid flow measuring means responsive to fluid flow through the conduit adapted to measure increments of intermittent flow of fluid therethrough; means actuated by the fluid flow measuring means operably connected to the fluid flow counter to actuate the flow counter in response to increments of fluid flowing through the flow measuring means; a time indication counter in the housing having raised digits thereon for continuously recording accumulated increments of time; a continuous timer adapted to continuously measure increments of time; means actuated by the timer operably connected to the time indication counter to actuate the time indication counter in response to continuous measurement of increments of time; openings in the upper surface of the housing arranged to receive and expose one lateral line of digits on each counter above said surface; guide means on the housing arranged to position a record imprinting member over said openings; and means mounted on the housing arranged to be impressed upon the record imprinting member positioned over the openings to impress the digits on the counters against the record imprinting member to make a printed record at any selected time of the accumulated increments of time and the accumulated number of increments of fluid recorded on the counters at such time.

2. The combination called for in claim 1 wherein the means arranged to be impressed on the record imprinting member is a resilient roller rotatably mounted in a roller casing hingedly attached at one end to the upper surface of the housing.

3. The combination called for in claim 2 with the addition of disengageable lock means to lock the roller casing in downward position.

4. The combination called for in claim 3 wherein the resilient roller is carried by a roller carrier having a handle protruding from the outer end of the roller housing, whereby the roller carrier may be moved outwardly and inwardly over a ticket disposed over said windows.

5. The combination called for in claim 1 wherein the increment measuring device is a flow meter for measuring liquid passed therethrough.

6. The combination called for in claim 1 wherein the actuating means between the flow measuring means and the fluid flow counter is a solenoid, and the actuating means between the timer and the time indication counter is a solenoid.

References Cited
UNITED STATES PATENTS

| | | | |
|---|---|---|---|
| 2,483,926 | 10/1949 | Nilson | 346—14 |
| 3,195,140 | 7/1965 | Schuh et al. | 346—43 |
| 3,236,415 | 2/1966 | Parker | 235—92 |
| 3,214,763 | 10/1965 | Davis | 346—43 |

RICHARD B. WILKINSON, *Primary Examiner.*

EDITH C. SIMMONS, *Assistant Examiner.*

U.S. Cl. X.R.

222—26